(12) United States Patent
Saito

(10) Patent No.: US 6,793,138 B2
(45) Date of Patent: Sep. 21, 2004

(54) INFORMATION CODE AND ITS READING DEVICE

(76) Inventor: Takahiro Saito, 60-11, Oeda, Edacho, Komatsujima-shi, Tokushima 773-0014 (JP)

( * ) Notice: Subject to any disclaimer, the term of this patent is extended or adjusted under 35 U.S.C. 154(b) by 0 days.

(21) Appl. No.: 10/424,650

(22) Filed: Apr. 25, 2003

(65) Prior Publication Data
US 2003/0201325 A1 Oct. 30, 2003

Related U.S. Application Data

(62) Division of application No. 09/729,414, filed on Dec. 4, 2000, now abandoned.
(60) Provisional application No. 60/170,815, filed on Dec. 15, 1999.

(51) Int. Cl.[7] .............................................. G06K 7/10
(52) U.S. Cl. ........................ 235/470; 235/454; 235/455
(58) Field of Search ............................. 235/454, 455, 235/470

(56) References Cited

U.S. PATENT DOCUMENTS 3,684,868 A * 8/1972 Christie et al. ........ 235/462.04
4,603,976 A * 8/1986 Fetzer et al. ................ 356/402
6,155,604 A * 12/2000 Greene et al. ................ 283/70

* cited by examiner

Primary Examiner—Thien M. Le
Assistant Examiner—Lisa M. Caputo
(74) Attorney, Agent, or Firm—J.C. Patents

(57) ABSTRACT

To provide an information code which copes with the lack of the number of displayable items of commodities and the number of sub-items allotted to each item, without enlarging the information code, which lack is imposed due to the limit of the quantity of displayable information by a monochromatic information code such as a bar code. The information code is formed by arranging three or more types of display areas in a predetermined arrangement, the display areas being different in color (reflected or radiated wavelength characteristic), and the wavelength characteristics of the display areas in the arrangement are combined to form a unit for displaying information. Further, to smoothly switch from the monochromatic barcode to the color barcode, the information code of the invention has a framework defining the relationship between a combination of the wavelength characteristics of the display areas in the arrangement and information items represented thereby, and the framework is designed to include a framework for displaying information of the monochromatic barcode.

13 Claims, 6 Drawing Sheets

FIG. 6A

| NUMBER OF SETTINGS | 0 | 1 | 2 | 3 | 4 | |
|---|---|---|---|---|---|---|
| BAR COLOR | WHITE | RED | GREEN | BLUE | BLACK | |
| COLOR OF EMITTED LIGHT — RED (r) | 0 | 0 | r+ | r+ | r+ | READING OF REFLECTION RESPONSIVENESS AND OUTPUTTING SIGNAL |
| GREEN (g) | 0 | g+ | 0 | g+ | g+ | |
| BLUE (b) | 0 | b+ | b+ | 0 | b+ | |
| DECODING (COUNTING) | 0 | g+ b+ | r+ b+ | r+ g+ | r+ g+ b+ | QUINARY NOTATION |
| | 0 | 1 | 2 | 3 | 4 | |
| NUMBER OF PRESENT SIGNALS | 7 | 1 | 2 | * | 8 | DECIMAL NOTATION |

FIG. 6B

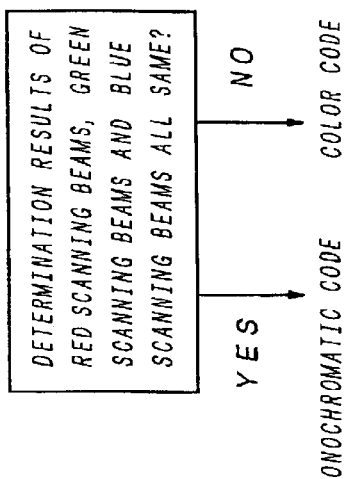

DETERMINATION RESULTS OF RED SCANNING BEAMS, GREEN SCANNING BEAMS AND BLUE SCANNING BEAMS ALL SAME?

YES → MONOCHROMATIC CODE

NO → COLOR CODE

INFORMATION CODE AND ITS READING DEVICE

This application is a divisional application of, and claims the priority benefit of, U.S. application Ser. No. 09/729,414 filed on Dec. 4, 2000, now abandoned, which claims benefit of No. 60/170,815, filed on Dec. 15, 1999.

BACKGROUND OF THE INVENTION

1. Field of the Invention

The present invention relates to an information code which displays information by combining a plurality of wavelength characteristics such as colors, and a reader for reading the same.

2. Description of the Related Art

Information codes such as barcodes are simple in printing and easy in reading, and therefore they are in widespread use as information display means for commodities and the like.

The barcodes are classified into various types, such as the JAN code, the standard ITF, the CODE=138, the CODE=39, and the NW-7 code, which are displayed in respective specific forms. According to the display form of the JAN code which is in wide use in Japan, seven black and white bars are combined to form one module representative of one numeral, and the 13 modules thus formed are arranged to represent 13-digit numerals. In the 13-digit numerals, the first two-digit numerals represent a national number, the next five-digit numerals a manufacturer number, and the following five-digit numerals a commodity number, respectively, and the final-digit numeral is for use in checking.

In the JAN code, only the 13-digit numerals can be represented, and hence only the five-digit numerals are allotted to display commodities. In recent days, however, commodities have been classified into more various types and packaged in smaller quantities, and therefore it is sometimes difficult to register all the commodities which a single store deals in. As a result, registering new commodities requires deletion of old commodity registrations which are unnecessary any more.

Such lack of displayable information quantity becomes significant as the field in which the barcode is employed spreads. For instance, a telephone company issues a phone call statement in which the lack of the displayable information quantity is augmented by printing both a long barcode which is increased in number of bars and a standard type barcode arranged in parallel. In this method of arranging a plurality of barcodes, the following problems can arise: That is, the barcodes can strongly oppress a display surface in which letters are printed, to thereby mar the appearance; a prolonged barcode is prone to be omitted when read by a hand scanner; and this method is available only if a large display space is secured. As a result, this method cannot be a radical solution to the problem.

Further, a new usage of the barcode, such as in sales management and commodity management, has been considered by displaying, in one lump, a date of manufacture, a name of a manufacturer, a date of packing, and a shelf life. In this usage, when a purchaser of the commodity makes payment, these information items are read and recorded. However, insofar as a monochromatic barcode (which means a single color is used over a ground color, such as black and white, or red and white) is employed to display such a large quantity of information items, the display pattern can be unfavorably complicated and a barcode label can be upsized, whereby the resulting barcode is rendered impractical.

Still further, another usage of the barcode, such as in manufacturing management of industrial products, has been considered by not only applying simple information tags on component parts or products to be managed but also applying an information code which displays detailed information items, such as a production history and an inspection result, by means of information codes. This is for acquiring detailed information of the component parts or the products, on the manufacturing site or on the shipping site without inquiring to a control system using a host computer, etc.

However, in this usage as well, it has been difficult to create a practical system because of limit of the displayable information quantity assigned to the monochromatic information code.

SUMMARY OF THE INVENTION

It is therefore a first object of the present invention to provide an information code which is capable of displaying a largely increased quantity of information without changing conventional display patterns.

It is a second object of the invention to provide a reader for such an information code.

The information code according to the present invention is formed by arranging three or more types of display areas in a predetermined arrangement, the display areas being different in reflected or radiated wavelength characteristic, wherein the wavelength characteristics of the display areas in the predetermined arrangement are combined to form a unit for displaying information.

Herein, the terms "being different in reflected or radiated wavelength characteristic" means that the display areas in the predetermined arrangement to form the information code are different in color, and that when the information code is formed into a stealth code using fluorescent materials, the fluorescent materials printed in the display areas are different in emitted wavelength. Further, the terms "three or more types of display areas (are) different in reflected or emitted wavelength characteristic" means that three or more types of display areas with respectively different wavelength characteristics are provided. If the display areas which are different in size and shape are used, the number of types of the display areas is equal to the number of combinations between the sizes and the shapes.

When the information code according to the present invention is intended to be used by replacing an existing monochromatic information code, it is difficult to smoothly switch to the information code of the present invention if the number of companies adopting the existing information code is extremely large.

To deal with this smooth switching, the present invention provides the following information code which can coexist with the other monochromatic information code.

That is, the present invention provides the information code having a display pattern formed by arranging three or more types of display areas in the same arrangement as in one of other information codes which are monochromatically displayed, the display areas being different in reflected or radiated wavelength characteristic, wherein the wavelength characteristics of the display areas in the arrangement are combined to form a unit for displaying information, characterized in that the information code has a framework defining a relationship between a combination of the wavelength characteristics of the display areas in the arrangement and information items represented thereby, the framework being designed to include a framework for monochromatically displaying information, defined by the one of the other information codes.

Unlike the monochromatic information code, the above described information code of the present invention is formed by the three or more types of display areas which are respectively different in reflected or radiated wavelength characteristic, and therefore it is necessary to discriminate the difference when reading.

A reader for the information code includes two types thereof, i.e. (a) a reader using white light as a light source, and (b) a reader using monochromatic light such as a laser source.

The reader using the white light as the light source, for reading the information code is comprised of a filter for separating reflected light or radiated light from the information code according to a difference in wavelength band, the information code being formed by arranging three or more types of display areas in a predetermined arrangement, the display areas being different in reflected or emitted wavelength characteristic, a plurality of detectors for photo-electrically converting light in every wavelength band separated by the filter, a plurality of determination circuits for determining whether an output from each of the detectors exceeds a predetermined determination level, and a decoder for decoding information displayed by the information code, based on a combination of the outputs from the determination circuits, and outputting the information decoded.

The reader using the monochromatic light sources such as the laser light, for reading the information code is comprised of a plurality of monochromatic light sources provided so as to correspond to the information code being formed by arranging three or more types of display areas in a predetermined arrangement, the display areas being different in reflected or radiated wavelength characteristic, and so as to correspond to the different wavelength characteristics of the display areas, a driving circuit for light-emitting the monochromatic light source by timesharing, a detector for photo-electrically converting the reflected light or the radiated light from the information code, a determination circuit for fetching an output from the detector at every wavelength band component in synchronization with a driving signal from the driving circuit, determining whether the output at the every wavelength band component exceeds a predetermined determination level, and further determining which wavelength band component is included in the output, based on the determination, and a decoder for decoding information displayed by the information code, based on a combination of outputs from the determination circuit, indicative of respective colors of emitted light, to thereby output a decoding result.

In place of the above-mentioned determination circuit, an A/D converter for converting the output from the detector at every wavelength band component into a digital value may be used, and the decoder may be one which compares a ratio of a received light quantity of each color of emitted light, output from the A/D converter with a previously registered ratio of a received light quantity of the each color, and determines a bar color as a color having a closest ratio. As a result, multicolored barcodes can be read by using the three monochromatic light sources.

According to a first aspect of the invention, the displayable information quantity can be increased by coating the display areas forming the information code with three or more colors. As a result, many inconveniences imposed by the lack of the displayable quantity by the conventional information code can be overcome. Further, by making full use of an information mass displaying function realized by the invention, the information code becomes applicable to new fields.

According to a second aspect of the invention, a framework of the relationship between a combination of the wavelength characteristics of the respective display areas in the arrangement of the color code and displayed information items is designed to include a framework for displaying information defined by the other monochromatic information code. In this information code, the number of information items allotted to the framework for monochromatically displaying information is considerably small relative to the entire number of displayable information items according to the invention. As a result, switching from the other information code to the information code of the invention can be smoothly carried out without impairing a characteristic of the invention that the quantity of displayable information can be increased.

According to a third aspect of the invention, there is provided a reader for the color barcode of the invention, using a white light source. As a result, actual use of the color barcode can be implemented.

According to a fourth aspect of the invention, a light receiver and a processing circuit for an output therefrom can be shared by employing timesharing method. As a result, the construction of a light receiving side of the reader can be simplified.

According to a fifth aspect of the invention, a ratio of a received light quantity of each color is compared with a previously registered ratio of a received light quantity of each color. As a result, the multicolored barcode can be read by three monochromatic light sources.

BRIEF DESCRIPTION OF THE DRAWINGS

These and other objects and advantages of the present invention will become clear from the following description with reference to the accompanying drawings, wherein:

FIG. 6A shows a table which is useful in determining the color as executed in the process in FIG. 5;

FIG. 6B shows a listing in which conditions for determining whether a read information code is a color code or a monochromatic code are itemized.

DETAILED DESCRIPTION OF THE PREFERRED EMBODIMENTS

The invention will now be described in detail with reference to the drawings showing embodiments thereof.

Figure 1:
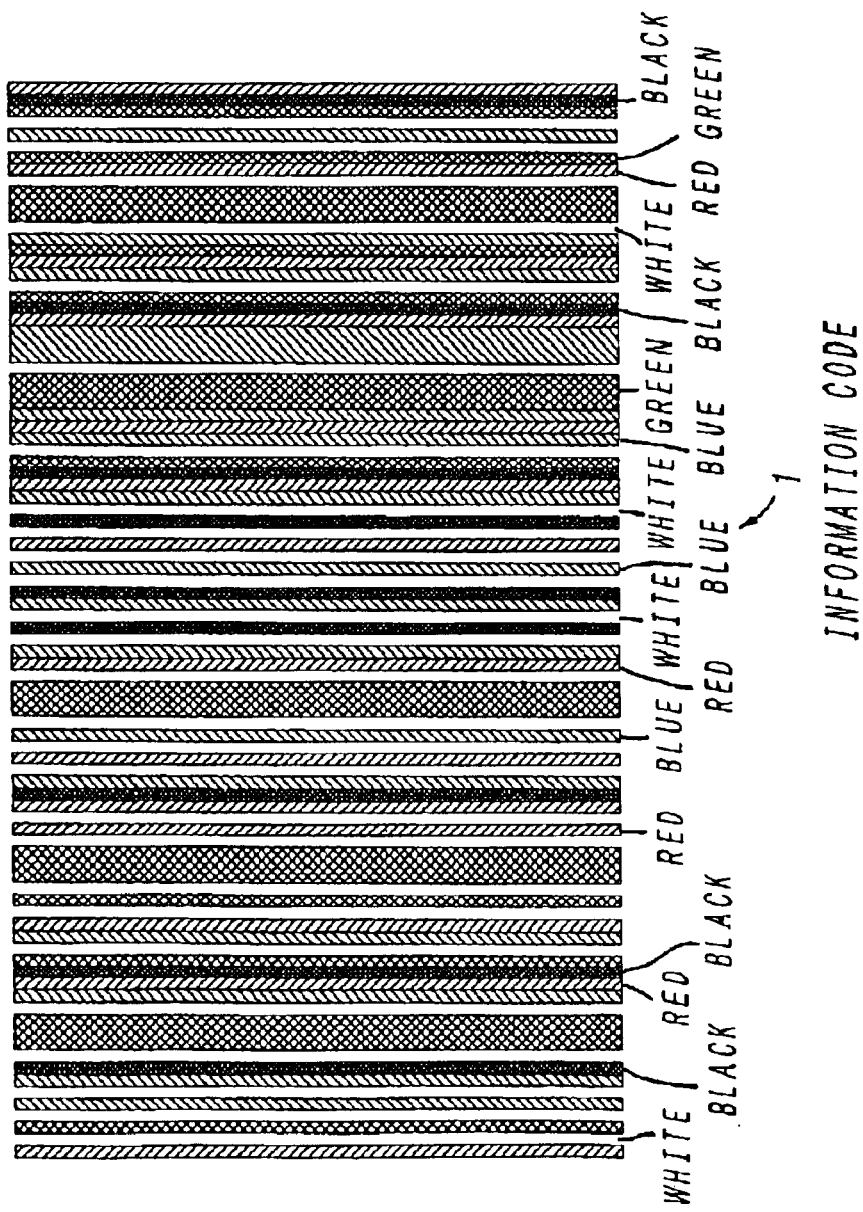
FIG. 1 is a view showing an example of an information code formed in the same display pattern as in a conventional monochromatic barcode, according to the present invention.

Referring first to FIG. 1, there is illustrated an information code 1 according to an embodiment of the invention, which is displayed in the same pattern as in the JAN code. In this information code, colors used for coating each bar are red, green, and blue which are the three primary colors of light in addition to black and white. Therefore, a single bar can represent five types of information items. In regard of this point, a bar with wider width as viewed in the figure is formed by a plurality of consecutive bars with the same color. The information code represents information by combining these colors, and therefore it can propose $5^{(7\times13)}=4.03897\times10^{63}$ items of information. The conventional monochromatic JAN code can present only $2^{(7\times13)}=2.47588\times10^{27}$ items of information, and therefore the information quantity proposed by the information code of the invention is $1.63133\times10^{36}$ times the information quantity of the conventional monochromatic JAN code.

Accordingly, the displayable information quantity extremely increases in comparison with the conventional barcode, leading to an increased number of displayable items by the information code, whereby more display digits can be allotted to each item.

This advantage will be described by taking for example an information code attached to commodities in a supermarket, in a more specific manner. By employing the information code of the invention, items such as a manufacture date, a packing date, a name of a manufacturer can be newly added to the information, to thereby improve control efficiency. In addition, the number of registered commodities can be increased, whereby chores of deleting registration of commodities which the supermarket has not dealt in can be dispensed with even when new commodities are registered.

Figure 2:
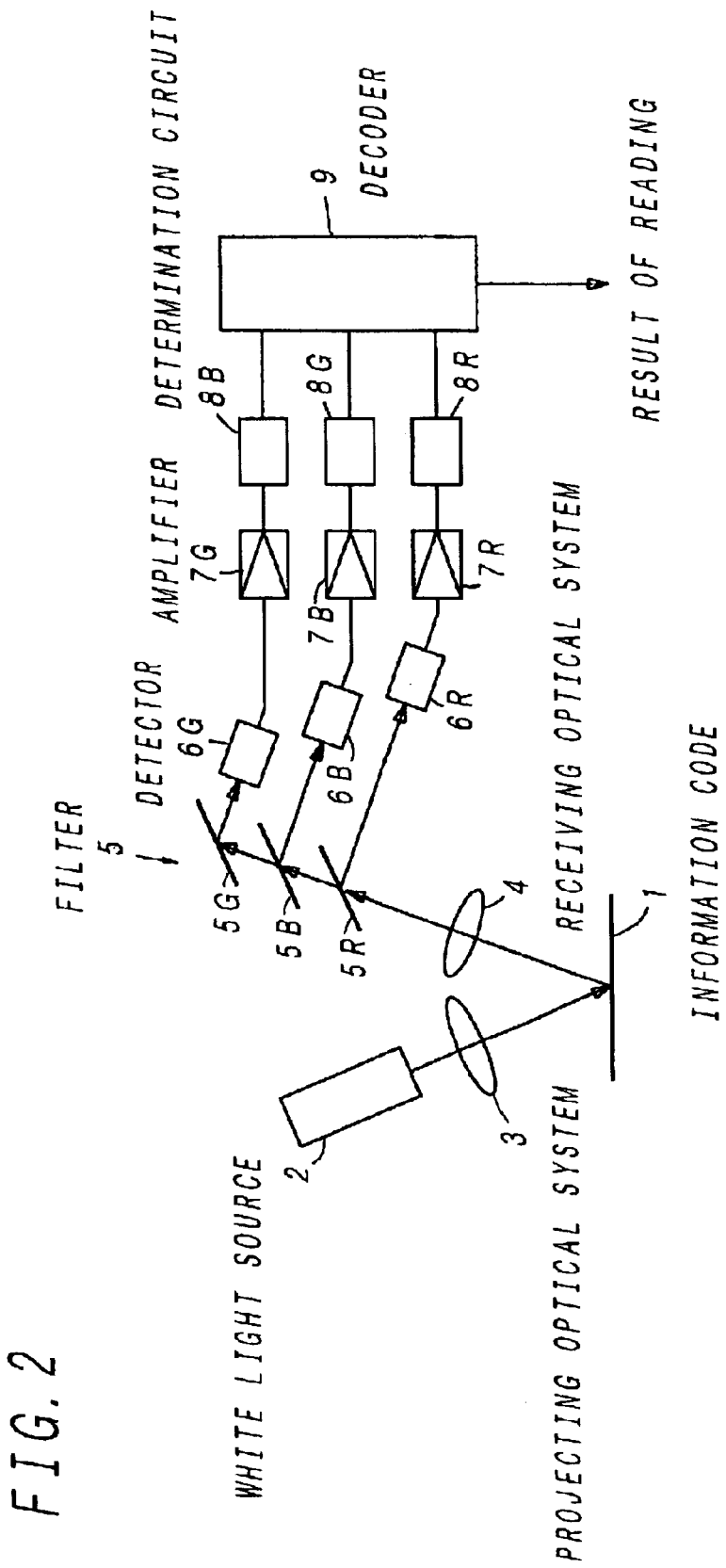
FIG. 2 is a block diagram showing the arrangement of an information code reader using a white light source, according to the present invention.

Next, the arrangement of a reader for the information code according to the invention will be described hereinbelow. FIG. 2 shows an example of the reader using a white light source, in which reference numerals 2, 3, and 4 designate, a white light source, a projecting optical system for gathering light emitted from the white light source on the information code 1, and a receiving optical system for forming image of light radiated or reflected from the information code 1. Further, reference numeral 5 designates a set of filters for separating light radiated or reflected from the information code 1 at every wavelength band component, which consist, in the illustrated example, for instance, of a dichroic mirror 5R for reflecting red light and allowing light other than the red light to pass through, a dichroic mirror 5G for reflecting green light and allowing light other than the green light to pass through, and an ordinary reflector 5B for reflecting remaining blue light. Reference numerals 6R, 6G, and 6B designate detectors for red, green, and blue colors, respectively, each formed, e.g. by a photo diode or the like when reading is carried out by scanning the barcode, or alternatively formed by a CCD sensor or the like when the reading is carried out by touching the barcode. Reference numerals 7R, 7G, 7B designate amplifiers provided so as to correspond to the detectors for the respective colors, and reference numerals 8R, 8G, 8B designate determination circuits for the respective colors, which each compares an output from each amplifier 7R, 7G, 7B with a predetermined reference level, to thereby determine which of the color detection signals (red, green, and blue) is included in the output. Reference numeral 9 designates a decoder for determining the color of each bar by using a predetermined timing signal, and for decoding the displayed information according to the predetermined relationship between the arrangement of the bar colors and the information items, followed by outputting the thus decoded information.

In regard of this point, the timing signal is generated based on a time period required for measuring the width of the bar as a reference value, which is measured, e.g. by a clock signal.

Figure 3:
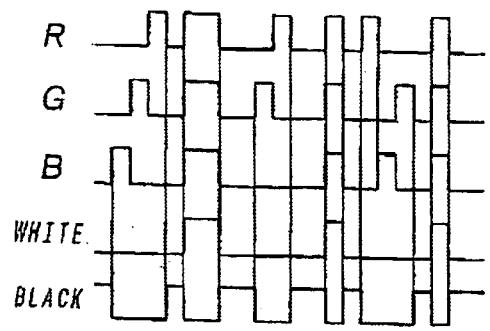
FIG. 3 is a timing chart which is useful in explaining a manner of black and white indication signals, based on three (R, G, B) detection signals.

In addition, although the outputs from the determination circuits 8R, 8G, 8B include only three types of signals, i.e. R, G, and B detection signals, the bar colors include black and white in addition to these colors. Therefore, as shown in FIG. 3, the decoder 9 determines that the output signal represents white when all the three detection signals are present, whereas it determines that the output signal represents black when all the three types of signals are absent. When the red, green, or blue color is determined, the R, G, or B detection signal is used on condition that white color is not determined.

Then, a predetermined operating process is executed based on the information displayed by the information code decoded and output by the decoder 9, and the decoded information is output onto a display or paper, followed by recording, etc. of the information into an administrative computer.

Figure 4:
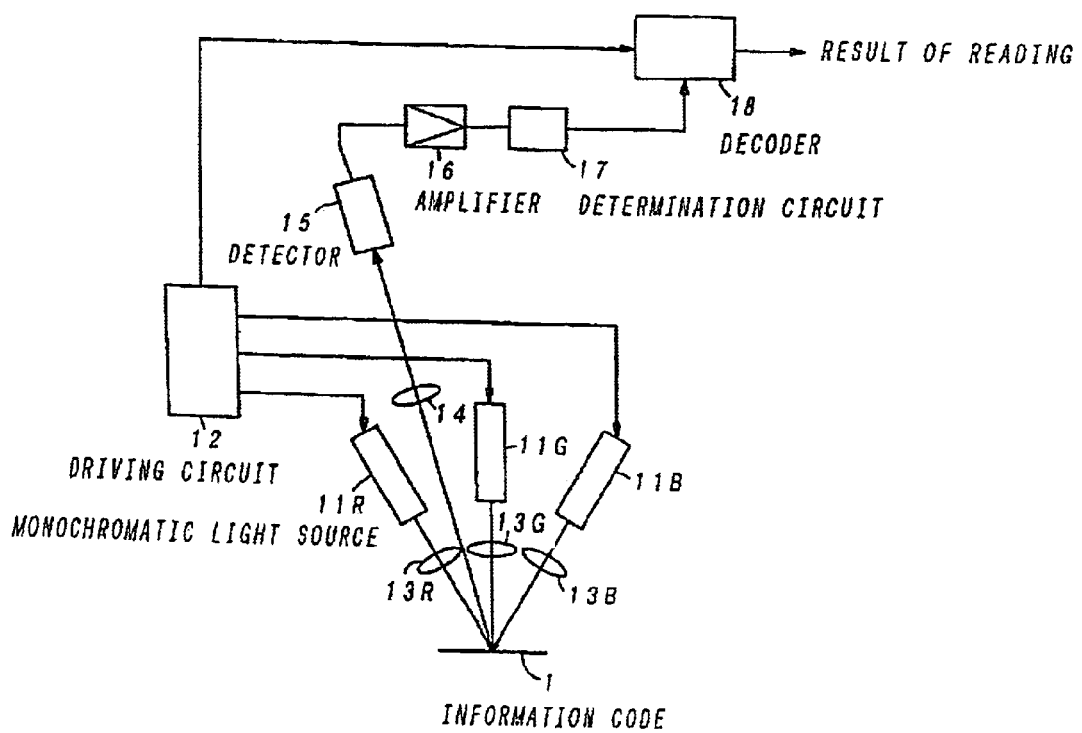
FIG. 4 is a block diagram showing the arrangement of an information code reader using a monochromatic light source in a manner of emitting the light by timesharing, according to the present invention.

FIG. 4 shows a reader according to another embodiment of the invention, in which the information code is read by using a plurality of monochromatic light sources, such as laser sources including laser scanners and hologram scanners. In this embodiment, the laser sources are used corresponding to colors used in the information code, such that the laser sources emit light by timesharing.

In FIG. 4, reference numerals 11R, 11G, 11B designate monochromatic light sources, such as laser sources emitting light with red, green, and blue colors, respectively, and reference numeral 12 a driving circuit for light-emitting each laser source by timesharing. The timesharing light emission is carried out by emitting beams of all the colors by shifting a light-emitting time period of each laser source at every scanning of a single bar, or alternatively by scanning the entire barcode by the light source of each color. Reference numerals 13R, 13G, 13B designate projecting optical systems for introducing light emitted from the laser sources to the information code 1, reference numeral 14 a receiving optical system for receiving light reflected by the information code 1, reference numeral 15 a detector formed by a photo diode or the like, for photo-electrically converting the light transmitted through the receiving optical system 14, and reference numeral 16 an amplifier for amplifying a photo-electrically converted output, respectively. Reference numeral 17 designates a determination circuit for fetching an output from the amplifier 16 at every wavelength band component in synchronization with a driving signal from the driving circuit 12, determining whether or not the output at every wavelength band component exceeds a predetermined determination level, and further determining which wavelength band component is included in the output. Reference numeral 18 designates a decoder which outputs a digital signal by decoding information displayed by the information code, based on a combination of results of the determination by the determination circuit 17. The recognition of each bar by using the decoder with reference to the timing signal is carried out in the same manner as in the embodiment shown in FIG. 2.

Next, description will be made of operations of the determination circuit 17 and the decoder 18. According to the present method in which the monochromatic light sources are used, the bars which form the information code and are different in reflected wavelength are irradiated with monochromatic beams each having color generating light (similar color light) and a wavelength (proximate wavelength), so as to be synchronized to the reflected wavelength of each bar. In this embodiment, three monochromatic light sources which are each synchronized to any of the colors (red, green, and blue) of the barcode are used. In this manner, difference in synchronization in the reflected beams (=synchronized-difference) is generated, and by using a reflection signals each being different in synchronization, the bar is read as a synchronous type signal or an asynchronous type signal.

The determination circuit 17 determines whether or not the color of each bar is synchronized to emit monochromatic beams. When red, green, and blue monochromatic beams are sequentially emitted to the barcode of the red, blue, green, white, and black colors, the determination circuit 17 outputs 0 when the bar is synchronized thereto, whereas it outputs 1 when the bar is desynchronized thereto. For example, when red (R), green (G), and blue (B) scanning beams are sequentially emitted, the decoder 18 determines the color of each line Bn of the barcode, according to a process shown in FIG. 5, based on results of the synchronization determination by the determination circuit 17.

Conditions for determining the bar color are shown in Table of FIG. 6A. When red light is emitted, only red bars are synchronized thereto, whereby the determination circuit 17 outputs 0. On the other hand, bars of the other colors are desynchronized to the red light, whereby the determination circuit 17 outputs 1 (+r). When green light is emitted, only green bars are synchronized thereto, whereby the determination circuit 17 outputs 0. On the other hand, bars of the other colors are desynchronized to the green light, whereby the determination circuit 17 outputs 1 (+g). When blue light is emitted, only the blue bars are synchronized thereto, whereby the determination circuit 17 outputs 0. On the other hand, bars of the other colors are desynchronized to the blue light, whereby the determination circuit 17 outputs 1 (+b). In combination of the determination results, the bar color can be determined. More specifically, conditions for determining the red bars are satisfied when they are synchronized only to the red light but desynchronized to the light other than the red light (i.e. +g, +b). Conditions for determining the green bars are satisfied when they are synchronized only to the green light but desynchronized to the light other than the green light (i.e. +r, +b). Conditions for determining the blue bars are satisfied when they are synchronized only to the blue light but desynchronized to the light other than the blue light (i.e. +r, +g). Conditions for determining the white bars are satisfied when they are synchronized (0) to the light of all the colors.

Conditions for determining the black bars are satisfied when they are desynchronized (+r, +g, +b) to the light of all the colors.

Further, by sequentially emitting the red, green, and blue monochromatic beams, it is possible to determine whether the barcode concerned is a color barcode or a monochromatic barcode, based on the outputs from the determination circuit 17. More specifically, as shown in FIG. 6B, if the outputs from the determination circuit 17 are the same with each other after emitting all the color beams, the scanned barcode is the monochromatic barcode, whereas if the outputs are not the same with each other, the barcode is the color barcode.

Based on the result, by automatically changing the logic of reading, the same device can be used as a reader for both the color barcode and the monochromatic barcode.

The types of the monochromatic beams for use in the above described method can be varied depending on the number of colors used in a barcode. For example, when colors used in the barcode consist of white, red, blue, and black, the red and blue monochromatic light sources are used in the same manner as described above.

Figure 5:
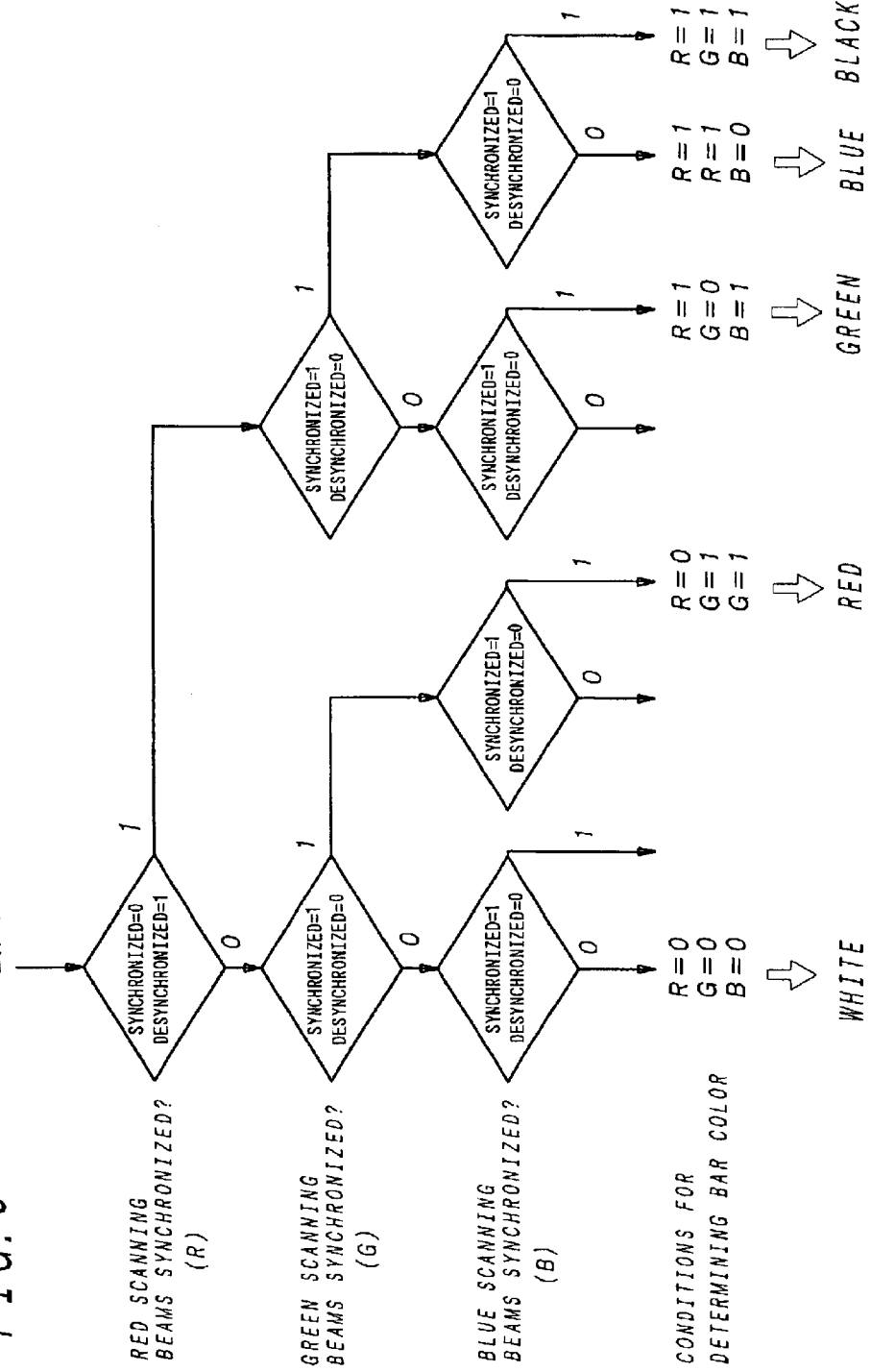
FIG. 5 is a flowchart showing a process for determining a color, which is executed by a decoder of the reader, based on a result of determination by a determination circuit.

If the number of colors used in the barcode exceeds the number described in FIGS. 5 and 6, it is possible to execute a similar process to the above, by using monochromatic light sources corresponding to the colors to be used in the barcode. In this case, however, an increased number of monochromatic light sources to be used can impose a hike in cost. To eliminate this problem, it is possible that in the reader employing the three (red, green, and blue) monochromatic light sources, a quantity of reflected light beams with respect to light emission is detected for each color, to thereby determine the bar color, based on a ratio of the reflected light quantity for each color. In this case, an A/D converter (not shown) for converting a received light quantity into a digital value is employed in place of the determination circuit 17, and at the same time the decoder 18 should be one which compares a ratio of the received light quantity of each color with a previously registered ratio of the received light quantity of each color, and determines the bar color is equal to the color having the closest ratio on condition that the received light quantity and the ratio are within respective predetermined tolerances. These tolerances are set for each color depending on the number of the colors. In this case, it is practical that the decoder 18 is realized by software processing of a computer. In registration of the bar colors, color samples with predetermined color gradation are provided, which are read by a barcode reader to be actually used and stored in the same. By this reading and storage, malfunctions caused by variation of each reader and degradation of the same with the lapse of time can be eliminated.

The monochromatic light source for use in the above described timesharing method is not limited to the laser source. For example, it is possible to use light-emitting diodes of three colors (R, G, and B) in place of the laser sources. The timesharing method is advantageous in that a light receiver, such as a photo diode or a CCD sensor, and a processing circuit for processing an output therefrom can be shared, and accordingly the plurality of filters and light receivers are not required unlike a case where white light source is used, which leads to simplified construction of the light receiving side of the reader.

Next, description will be made of a case where the information code according to the invention is employed in the sales site where the monochromatic information code is actually used.

When the information code of the invention is employed in order to cope with the lack of information quantity displayed by the conventional information code, it is impossible to cope with the exchange of the information codes at a time if a very large number of manufacturers adopted the information codes attached to commodities, etc., for instance.

In this case, to read both the conventionally used monochromatic information code and newly employed information code applied on the commodities, etc., reading means can be doubly provided. In this case, however, the reader becomes complicated, resulting in hiked costs.

To eliminate the inconvenience, the information code according to the invention is designed to be the same in display pattern as the other monochromatic barcode, and at the same time a framework defining the relationships between the combination of the display areas of the information code of the invention and the represented information items is designed to include a framework for monochromatically displaying information, according to the other information code. By this designing, switching from the monochromatic barcode to the color barcode can be facilitated without hiked costs of the reader.

More specifically, as shown in FIG. 1, for instance, the information code of the invention is formed by bars of five colors, i.e. white, black, red, green, and blue in the same pattern as in the JAN code, and out of the information code in the display pattern formed by the combination of the colored bars, black and white bars alone are used as the barcode of the JAN code as they are. The conventional monochromatic JAN code is different from the information code displayed by the plurality of colors of the invention in a display manner. For example, the number of bars for use in representing a single-digit numeral is different. Therefore, it is necessary to discriminate the difference when reading.

Figure 7:
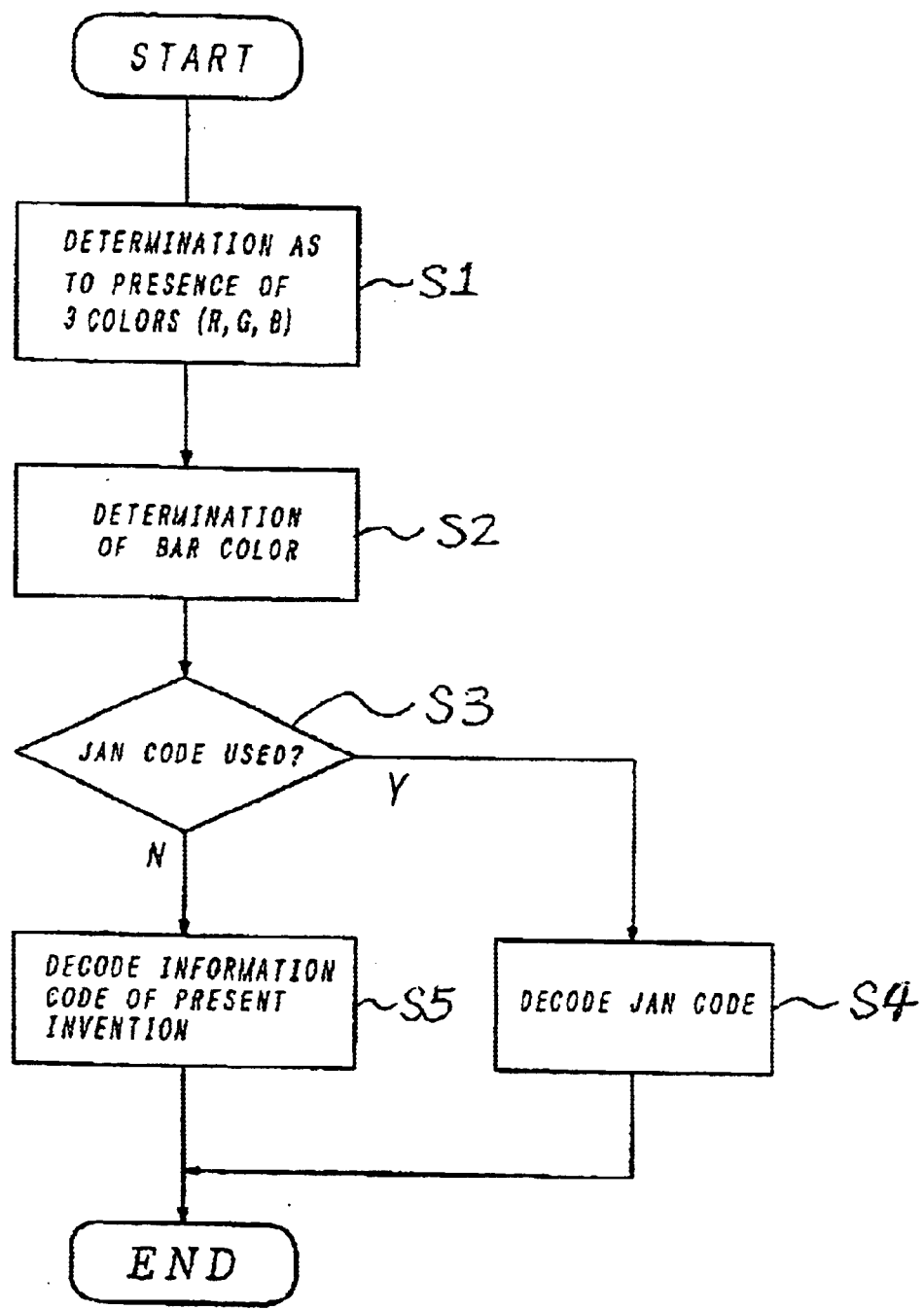
FIG. 7 is a flowchart showing a process for decoding an information code in a case where the information code of the invention includes the framework for displaying an existing monochromatic barcode.

A process for reading either the conventional monochromatic barcode or the color barcode of the invention is described in FIG. 7, for instance. This process will be described as part of tire process executed by the determination circuit 17 and the decoder 18 of the reader shown in FIG. 4. First, a light receiving signal output from the amplifier 16 is processed based on a timesharing signal from the driving circuit 12 and the predetermined timing signal, to thereby determine whether or not each bar includes any of the three colors of R, G, and B (S1). Next, it is determined whether the color of each bar is white, black, red, green, or blue, based on the principle described hereinbefore with reference to FIGS. 5 and 6 (S2). Then, it is determined whether or not all the bars or the bars in a specific range assume white or black, and based on a result of the determination, it is further determined whether or not the conventional JAN code is used. (S3). If the bars are displayed by the conventional JAN code, a JAN code interpretation table is referred to (S4), whereas if they are displayed by the information code of the invention, an information code interpretation table of the invention is referred to (S5). Then, data represented by the bar code are decoded, followed by outputting digital data. In regard of this point, the determination as to whether the conventional JAN code is employed may be carried out to the entire information code or alternatively to each information unit, such as a commodity code out of the entire information code.

The above description has been made of the information code having the same display pattern as in the JAN code, but this is not limitative. Alternatively, the information code of the present invention can be applicable to barcodes having the other display forms, such as the standard ITF, the CODE=138, the CODE=39, and the NW-7 code, as well. For example, the standard ITF and the CODE=138 are the forms in which the number of the barcodes are reduced by combining bars with different widths. Therefore, when colors of the information code of the invention are combined with these bars, the number of information items represented by a single bar is as many as (the number of width types)×(the number of colors), and therefore the effect of the present invention can be further enhanced.

Further, the present invention is also applicable to a two-dimensional code and a stealth code.

The two-dimensional code is for displaying information by combining two-dimensionally arranged display areas (minimum display units coated with black or white), which includes the well-known PDF417, Carra code, etc. According to the invention, this two-dimensional code is formed by the three or more display areas which are different in reflected or radiated wavelength characteristic, and the wavelength characteristics of the respective display areas in the two-dimensional arrangement are combined to represent a unit for displaying information.

In this case, the increased quantity of the displayable information brought about by multi-coloring according to the invention is displayed in the two-dimensional code having a large number of arrangements of the display areas. As a result, the quantity of displayable information can be especially increased.

In the stealth code, the information code is printed by using pale transparent ink containing a fluorescent material, and when the information code is irradiated by excitation beams such as infrared rays, light radiated from the fluorescent material is detected, to thereby carry out reading. The stealth code is rendered invisible with naked eyes, and therefore it is excellent in security and designing.

In implementation of the information code of the invention in the stealth code, a plurality of types of fluorescent materials which each radiates light with different wavelengths are provided, and the display areas are coated with inks containing the fluorescent materials, followed by printing the information code. For example, red, green, and blue are displayed by coating the areas with the inks containing the fluorescent materials radiating light of the respective colors, white is displayed by an ink containing a mixture of the above three fluorescent materials, and black is displayed by not coating the area.

Reading is carried out in the following manner: That is, infrared rays or the like for exciting the fluorescent materials are applied to the fluorescent materials, to radiate beams of the respective colors, and the thus radiated beams with different wavelengths are read by the reader formed by combining the filter and the detector, as shown in FIG. 2, at every wavelength. In this reading system, the fluorescent material may be one which radiates not visible rays but invisible rays such as infrared rays.

The invention further proposes a variation of the stealth code such as a barcode printed under a surface layer. In this variation, only a ground color of the surface layer is visible in normal times, and when the barcode is read, heat is applied on the surface layer to make the same transparent, whereby the barcode under the layer appears. In this case as well, by coating the barcode on the lower layer with colors as information carriers, the effect of the invention can be achieved.

In the above embodiments, colors (reflected or radiated wavelength characteristics) employed in the information code of the invention are red, green, and blue, in addition to black and white, but this is not limitative. Alternatively, the colors may be cyan (C), magenta (M), and yellow (Y), or the other combination of colors. Further, the number of the colors can be increased by employing neutral colors between these employed colors, which further increases the number of displayable information items.

If the number of display areas which are different in reflected or radiated wavelength characteristic is three or more, the effect of increased quantity of displayable information of the invention can be achieved, and if the number of wavelength characteristics is five or more, the effect is sufficiently achieved. As the number is increased, the effect extremely increases. However, a too large number of the colors requires a reader with higher accuracy, which imposes high costs. The suitable number of colors with which satisfactory effect of the invention is achieved and at the same time manufacturing costs can be suppressed low is five, under current circumstances, i.e. three colors of red, green, and blue or cyan, magenta, and yellow, in addition to black and white.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A reader for an information code having bars in a bar code display area, said reader comprising:
   a plurality of light sources, each of the light sources emitting a light with a color having a wavelength different from that of a light emitted from the other light source;
   a driving circuit for emitting a light beam from said light sources one after another in a sequential manner during a scanning time of said information code;
   a detector for detecting a reflected light from the bars in the bar code display area;
   a determination circuit for outputting a signal indicating characteristic of the reflected light based on the reflected lights detected by the detector, wherein the determination circuit determines whether or not the reflected light indicates a synchronized reflection or a desynchronized reflection with respect to each of the light beam emitted from the light sources and for outputting a signal indicating either one of synchronization and de-synchronization; and
   a decoder for determining a color of each of the bars in the bar code display area based on the output signal from the determination circuit to output a decoding result.

2. The reader according to claim 1, wherein the plurality of light sources include a first light source emitting a first light with a first color, a second source emitting a second light with a second color, and a third light source emitting a third light with a third color and said first color, second color, and third color are different from black and white.

3. The reader according to claim 2, wherein the first color is Red, the second color is Green, and the third color is Blue.

4. The reader according to claim 2, wherein the determination circuit determines whether the reflected light from the bars is synchronized with the first light, the second light or the third light and the decoder determines a color of a bar is the first color when the determination result of the determination circuit is such that the reflected light from said bar is synchronized with the first light and is desynchronized with the second color and the third color.

5. The reader according to claim 4, wherein the determination circuit determines whether the reflected light from the bars is synchronized with the first light, the second light and the third light and the decoder determines a color of a bar is black when the determination result of the determination circuit is such that the reflected light from said bar is desynchronized to all of the first, second, and third colors.

6. The reader according to claim 5, wherein the determination circuit determines whether the reflected light from the bars is synchronized with the first light, the second light or the third light and the decoder determines a color of a bar is white when the determination result of the determination circuit is such that the reflected light from said bar is synchronized to all of the first, second, and third colors.

7. The reader according to claim 6, wherein the decoder refers to a conventional black and white interpretation table when it is determined all the bars are black or white and refers to another information code interpretation table when it is determined some of the bars are found to be other than black and white.

8. The reader according to claim 1, wherein the decoder determines a color of the bars printed in the bar code display area based on the output signal from the determination circuit and is for referring to a conventional black and white interpretation table when it is determined all the bars are black or white and for referring to another information code interpretation table when it is determined some of the bars are found to be other than black and white and for outputting a decoding result.

9. The reader according to claim 8, wherein said conventional black and white interpretation table includes a JAN code interpretation table.

10. The reader according to claim 9, wherein said information code includes 13 modules, each module having seven bars, each bar with a color selected from a group consisting white, black, red, black, and green.

11. A reader for an information code having a plurality of bars arranged in a bar code display area, said reader comprising:
    a white source for emitting a light;
    a projecting optical system for gathering a light emitted from the white light source over the information code;
    a plurality of filters for separating the light reflected from the information code according to wavelength thereof, wherein the filters include
        a first filter for reflecting a first light with a first color,
        a second filter for reflecting a second light with a second color, and
        a third filter for reflecting a third light with a third color, and
        said first color, second color, and third color are different from black and white;
    a plurality of detectors for detecting a color of the reflected light based on the separation result by the filters and outputting a signal corresponding to the separation result;
    a plurality of determination circuits for determining whether an output signal from each of the detectors exceeds a predetermined determination level; and
    a decoder for decoding information displayed in said information code based on the determination result by the determination circuits and for outputting a decided information, wherein the decoder determines first
        a color of bar is the first color if the first color if the first light is detected, but the second light and the third light are not detected from and bar;
        a color of a bar is the second color if the second light is detected but, the first light and the third light are not detected from said bar;
        a color of a bar is the third color if the third light is detected, but the first light and the second light are not detected from said bar;
        a color of a bar is white if the first light, the second light and the third light are all detected from said bar; and
        a color of a bar is black if none of the first light, the second light and the third light are detected from said bar.

12. The reader according to claim 11, wherein the first color is Red, the second color is Green, and the third color is Blue.

13. A reader for an information code having bars in a bar code display area, said reader comprising:

a plurality of light sources, each of the light sources emitting a light having a wavelength different from that of a light emitted from the other light source, the plurality of light sources including a first light source emitting a first light with a first wavelength, a second light source emitting a second light with a second wavelength, and a third light source emitting a third light with a third wavelength and said first wavelength, second wavelength, and third wavelength being different from each other and that of black and white;

a driving circuit for emitting a light beam from said light sources one after another in a sequential manner during a scanning time of said information code;

a detector for detecting a reflected light from the bars in the bar code display area;

a determination circuit for outputting a signal indicating characteristic of the reflected light based on the reflected lights detected by the detector, wherein the determination circuit determines whether or not the reflected light indicates a synchronized reflection or a desynchronized reflection with respect to each of the light beam emitted from the light sources and for outputting a signal indicating either one of synchronization and de-synchronization; and a decoder for recognizing each of the bars in the bar code display area based on the output signal from the determination circuit to output a decoding result.

* * * * *